US008616562B2

(12) United States Patent
Maras

(10) Patent No.: US 8,616,562 B2
(45) Date of Patent: Dec. 31, 2013

(54) ADAPTER FOR COUPLING AN ACCESSORY TOOL TO A DRIVE MEMBER OF A POWER TOOL

(75) Inventor: Verica Maras, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 831 days.

(21) Appl. No.: 12/816,546

(22) Filed: Jun. 16, 2010

(65) Prior Publication Data

US 2011/0309589 A1 Dec. 22, 2011

(51) Int. Cl.
*B23B 31/02* (2006.01)

(52) U.S. Cl.
USPC ......... 279/143; 83/698.41; 451/359; 451/357

(58) Field of Classification Search
USPC .................... 279/143–145; 83/664, 665, 666, 83/698.41, 782; 451/257, 359, 357; 606/176, 177, 178; 30/339, 166.3, 392
See application file for complete search history.

(56) References Cited

U.S. PATENT DOCUMENTS

| | | | | | |
|---|---|---|---|---|---|
| 4,637,170 | A | * | 1/1987 | Block | 451/342 |
| 4,920,702 | A | | 5/1990 | Kloss et al. | |
| 4,980,976 | A | | 1/1991 | Junginger et al. | |
| 5,038,478 | A | | 8/1991 | Mezger et al. | |
| 5,303,688 | A | | 4/1994 | Chiuminatta et al. | |
| 5,366,312 | A | | 11/1994 | Raines | |
| 5,477,845 | A | | 12/1995 | Zuzelo | |
| 5,584,753 | A | * | 12/1996 | Takahashi | 451/342 |

(Continued)

FOREIGN PATENT DOCUMENTS

| | | | |
|---|---|---|---|
| DE | 4444496 | A1 | 6/1996 |
| DE | 10164081 | | 7/2003 |

(Continued)

OTHER PUBLICATIONS

McFeelys website page "Bosch Multi-X Replacement Adapter"; http://www.mcfeelys.com/product/RB-0788/Bosch-Multi-X-Replacement-Adapter; published at least as early as Apr. 7, 2010; (1 page).

(Continued)

*Primary Examiner* — Eric A Gates
*Assistant Examiner* — Paul M Janeski
(74) *Attorney, Agent, or Firm* — Maginot, Moore & Beck

(57) ABSTRACT

An adapter is provided for coupling an accessory tool to any of a plurality of power tools wherein each of the plurality of power tools has a distinct tool drive structure. The adapter has body that includes a first side surface, and a second side surface positioned opposite to the first side surface. An inner peripheral surface extends from the first side surface to the second side surface that defines a central opening, and an outer peripheral surface extends from the first side surface to the second side surface. The first side surface has defined therein a plurality of recesses positioned around the central opening. In addition, the body has a first adapter drive structure and a second adapter drive structure. The first adapter drive structure and the second adapter drive structure define the plurality of recesses, and the first adapter drive structure and the second adapter drive structure each possesses a distinct configuration in comparison to each other. The first adapter drive structure is configured to mate with a first tool drive structure of a first power tool of the plurality of power tools, and the second adapter drive structure is configured to mate with a second tool drive structure of a second power tool of the plurality of power tools.

22 Claims, 8 Drawing Sheets

(56) References Cited

U.S. PATENT DOCUMENTS

| | | | | | |
|---|---|---|---|---|---|
| 5,694,693 | A | * | 12/1997 | Hutchins et al. | 30/166.3 |
| D424,076 | S | | 5/2000 | Dibbern et al. | |
| 6,116,996 | A | | 9/2000 | Yanase | |
| D467,485 | S | | 12/2002 | Daniels et al. | |
| 6,743,086 | B2 | | 6/2004 | Nelson et al. | |
| 6,796,888 | B2 | | 9/2004 | Jasch | |
| 6,802,764 | B2 | | 10/2004 | Besch | |
| 6,865,813 | B2 | | 3/2005 | Pollak | |
| 6,929,538 | B2 | | 8/2005 | Yi | |
| 6,945,862 | B2 | | 9/2005 | Jasch et al. | |
| 7,189,239 | B2 | * | 3/2007 | Fisher et al. | 606/82 |
| 7,217,177 | B2 | * | 5/2007 | Frech et al. | 451/359 |
| 7,695,352 | B2 | | 4/2010 | Schumacher | |
| D619,152 | S | * | 7/2010 | Evatt et al. | D15/138 |
| 8,151,679 | B2 | * | 4/2012 | Bohne | 83/698.11 |
| 2003/0176225 | A1 | | 9/2003 | Besch et al. | |
| 2005/0153640 | A1 | | 7/2005 | Stein et al. | |
| 2010/0052269 | A1 | * | 3/2010 | Zaiser et al. | 279/144 |
| 2010/0056029 | A1 | | 3/2010 | Grunikiewicz | |
| 2011/0227300 | A1 | * | 9/2011 | Zhang et al. | 279/143 |
| 2011/0291368 | A1 | * | 12/2011 | Chen et al. | 279/143 |
| 2011/0316242 | A1 | * | 12/2011 | Zhang et al. | 279/143 |

FOREIGN PATENT DOCUMENTS

| | | | |
|---|---|---|---|
| DE | 102004050798 | | 4/2006 |
| DE | 102007036786 | A1 | 10/2008 |
| WO | 2011000322 | A1 | 1/2011 |

OTHER PUBLICATIONS

Tools-Plus.com website page "Rockwell RW9190 SoniCrafter Adapter"; http://www.tools-plus.com/rockwell-rw9190.html; published at least as early as Jun. 15, 2010; (2 pages).

International Search Report in corresponding PCT Application (i.e., PCT/US2011/040321), mailed Nov. 24, 2011 (11 pages).

* cited by examiner

ADAPTER FOR COUPLING AN ACCESSORY TOOL TO A DRIVE MEMBER OF A POWER TOOL

FIELD

This invention relates to the field of power tools, and more particularly to adapters for securing an accessory to a tool holder of a power tool.

BACKGROUND

In general, rotary tools and oscillating tools are lightweight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool holder, that extends from a portion of the main body of the power tool. The electric motor is configured to rotate and/or oscillate the tool holder at relatively high frequencies. The tool holder in turn is configured to secure different accessory tools so that as the tool holder is driven to move by the electric motor, an accessory tool secured to the holder is driven to perform work on a workpiece.

To enable a secure connection between a tool holder for a power tool and accessory tools for use with the power tool, tool holders and associated accessory tools are provided with drive structures that mate to secure an accessory tool to a tool holder. For example, a tool holder of a power tool is provided with a tool drive structure that comprises one or more protrusions having a predetermined configuration and/or arrangement with respect to the tool holder. An accessory tool for use with the tool holder is provided with an accessory drive structure defining one or more openings and/or recesses that are configured and/or arranged complementary to the features of the tool drive structure of the tool holder. When the accessory tool is placed onto the tool holder, the protruding features of the tool drive structure are received in the corresponding openings and/or recesses defined by the accessory drive structure. A clamping device, such as a clamping screw, is then used to clamp the accessory tool to the tool holder thereby locking the tool drive structure and the accessory drive structure into engagement with each other.

While the use of complementary drive structures is effective in securing an accessory tool to the tool holder of a power tool, variations in tool drive structures incorporated into the tool holders of various power tools limits the ability of an accessory tool configured for use with the tool holder of one power tool to be secured to the tool holder of other power tools.

SUMMARY

In accordance with one embodiment, an adapter is provided for coupling an accessory tool to any of a plurality of power tools wherein each of the plurality of power tools has a distinct tool drive structure in comparison to the tool drive structures of the rest of the plurality of power tools. The adapter comprises a body that includes a first side surface and a second side surface positioned opposite to the first side surface. An inner peripheral surface extends from the first side surface to the second side surface that defines a central opening, and an outer peripheral surface extends from the first side surface to the second side surface. The first side surface has defined therein a plurality of recesses positioned around the central opening. The body has a first adapter drive structure, a second adapter drive structure, and a third adapter drive structure. The first adapter drive structure and the second adapter drive structure define the plurality of recesses, and the third adapter drive structure defines the central opening. The first adapter drive structure, the second adapter drive structure, and the third adapter drive structure each possesses a distinct configuration in comparison to each other. The first adapter drive structure is configured to mate with a first tool drive structure of a first power tool of the plurality of power tools, the second adapter drive structure is configured to mate with a second tool drive structure of a second power tool of the plurality of power tools, and the third adapter drive structure is configured to mate with a third tool drive structure of a third power tool of the plurality of accessory tools.

In another embodiment, an adapter is provided for coupling an accessory tool to any of a plurality of power tools wherein each of the plurality of power tools has a distinct tool drive structure in comparison to tool drive structures of the rest of the plurality of power tools. The adapter comprises a body that includes a first side surface, and a second side surface positioned opposite to the first side surface. An inner peripheral surface extends from the first side surface to the second side surface that defines a central opening, and an outer peripheral surface extends from the first side surface to the second side surface. The first side surface has defined therein a plurality of recesses positioned around the central opening. In addition, the body has a first adapter drive structure and a second adapter drive structure. The first adapter drive structure and the second adapter drive structure define the plurality of recesses, and the first adapter drive structure and the second adapter drive structure each possesses a distinct configuration in comparison to each other. The first adapter drive structure is configured to mate with a first tool drive structure of a first power tool of the plurality of power tools, and the second adapter drive structure is configured to mate with a second tool drive structure of a second power tool of the plurality of power tools.

DESCRIPTION

Figure 1:
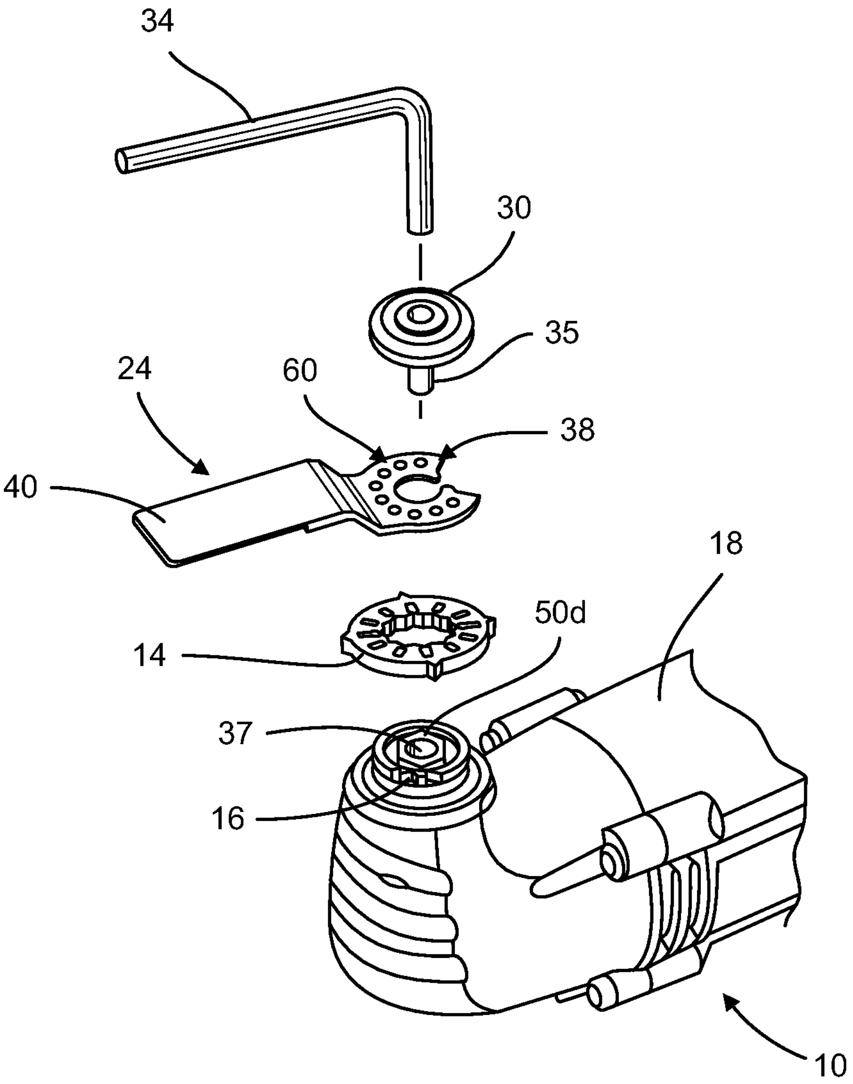
FIG. 1 is a perspective view of a power tool, an accessory tool, and an adapter according to one embodiment of the invention for coupling the accessory tool to the power tool.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Referring to FIG. 1, the present disclosure is directed to an adapter 14 that enables an accessory tool 24 to be coupled to a power tool 10. As explained below, accessory tool 24 has an accessory drive structure configured to mate with a particular tool drive structure configuration incorporated into the tool holder of a power tool. Power tool 10 includes a tool holder 16 having a tool drive structure that is distinct from tool drive structures embodied in other power tools (see e.g., FIGS. 2A-2F). The adapter 14 enables the accessory drive structure of the accessory tool 24 to mate with each of the plurality of distinct tool drive structures that may be incorporated into the tool holder 16 of the power tool 10.

As depicted in FIG. 1, power tool 10 includes a main body 18 that serves as both a hand grip for the tool 10 as well as a housing for retaining an electric motor (not shown) for the tool 10. The electric motor is operably coupled to the tool holder 16, and is configured to drive the tool holder 16 to rotate, oscillate, or carry out other suitable types of movement. Power for the electric motor is received from a suitable power source (not shown), such as an internal batter supply or a power cord connected to an AC wall outlet.

The tool holder 16 includes a tool drive structure 50*d* that is configured to interlock with an accessory drive structure of an accessory tool so that the movement imparted to the tool holder 16 by the motor may be used to drive the accessory tool to perform work on a workpiece. FIGS. 2A-2F depict various tool drive structures 50*a*-50*f* that may be incorporated into the tool holder 16 of the power tool 10. Each of the tool drive structures 50*a*-50*f* of FIGS. 2A-2F represent tool drive structures of various power tool manufacturers and have a distinct configuration relative to the other tool drive structures. In the embodiment of FIG. 1, the tool holder 16 is provided with the tool drive structure 50*d* although, as mentioned, the tool holder 16 may be provided with any one of the tool drive structures 50*a*-50*f* of FIGS. 2A-2F. In addition, tool holder 16 includes a fastening structure 37 that is configured to mate with a suitable clamping device 30 for securing an accessory tool to the tool holder 16. In the embodiment of FIG. 1, fastening structure 37 comprises an internally threaded bore defined in tool holder 16, and the fastening device 30 comprises a clamping screw having a longitudinal portion 35 configured for mating engagement with the bore 37. As depicted, a fastener driver 34, such as a hex key, is used to drive the clamping screw 30 so that the longitudinal portion 35 of the clamping screw is driven into engagement with the bore 37. In alternative embodiments, any suitable type of fastening structure 37 for the tool holder 16 and corresponding fastening device 30 may be used.

The tool drive structures 50*a*-50*f* of FIGS. 2A-2F comprise protrusions having a predetermined size, shape, and/or position in relation to each other and the tool holder. For example, the tool drive structure 50*a* shown in FIG. 2A comprises twelve (12) protrusions 52 that are evenly spaced from each other about the central bore 37 defined in the tool holder 16. Tool drive structure 50*b* of FIG. 2B comprises eleven (11) protrusions 54 that are evenly spaced about bore 37, and an area 55 devoid of protrusions that may be used as an indicator to facilitate mounting an accessory tool at a desired orientation with respect to the clamping assembly. The tool drive structure 50*c* of FIG. 2C comprises four (4) T-shaped protrusions 56 that are spaced approximately 90° apart relative to the circumference of the bore 37. Tool drive structure 50*d* of FIG. 2D comprises a single hex-shaped protrusion 57 that surrounds and is centered on the bore 37. Tool drive structure 50*e* of FIG. 2E comprises four (4) elongated protrusions 58 that are spaced approximately 90° apart relative to the circumference of the bore 37, similar to tool drive structure 50*c*. Tool drive structure 50*f* of FIG. 2F comprises four (4) pin-shaped protrusions 59 that are spaced approximately 90° apart relative to the circumference of the bore 37, similar to tool drive structures 50*c* and 50*e*.

Figure 3:
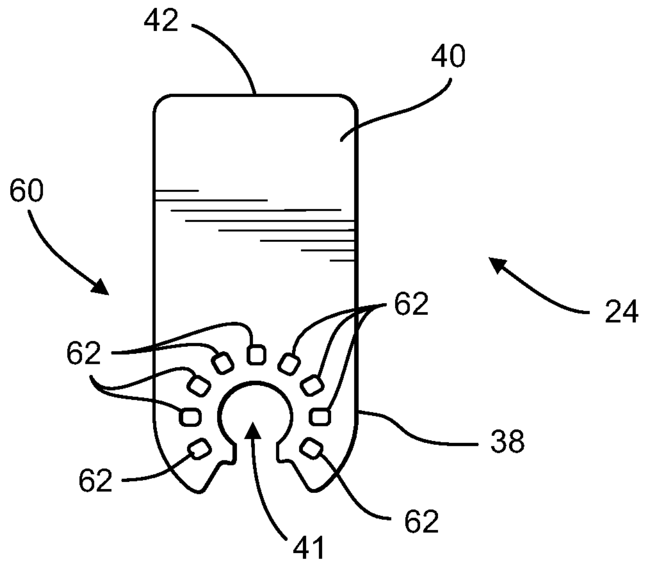
FIG. 3 is an elevational view of the accessory tool shown in FIG. 1.

As depicted in FIG. 3, accessory tool 24 includes a mounting portion 38 that is used to secure the accessory tool 24 to a tool holder 16, and a work portion 40 that extends from the mounting portion 38 for performing work on a workpiece. In the embodiment of FIGS. 1 and 3, the work portion 40 of accessory tool 24 comprises a flexible scraper having an outer edge 42 configured to perform scraping operations. In alternative embodiments, the work portion 40 may have a number of other configurations for performing different functions on a workpiece, such as sanding, polishing, grinding, and other types of cutting.

Mounting portion 38 of accessory tool 24 defines a central opening or slot 41 through which the longitudinal portion 35 passes prior to being engaged with the bore 37 of tool holder 16. Mounting portion 38 also defines an accessory drive structure 60 that is configured to mate with a particular tool drive structure configuration. In the embodiment of FIGS. 1 and 3, the accessory drive structure 60 of accessory tool 24 is configured to mate with the tool drive structure 50*b* depicted in FIG. 2B. As best seen in FIG. 3, the accessory drive structure 60 comprises a plurality of openings 62, in this case nine (9), defined in the mounting portion 38 of the accessory tool 24. The openings 62 are sized and positioned complementarily with respect to the protrusions 54 of the tool drive structure 50*b* so that, when used together, the protrusions 54 of the tool drive structure 50*b* are received in the openings 62 of the accessory drive structure 60. Thus, the accessory drive structure 60 of accessory tool 24 is capable of interlocking a tool holder of a power tool having the tool drive structure **50*b*** shown in FIG. 2B.

Adapter 14 according to the present disclosure enables the accessory tool 24 to be secured to power tools that do not have the tool drive structure **50*b*, such as power tool 10 of FIG. 1. Referring to FIGS. 4-8, adapter 14 comprises a body 100 formed of a durable, rigid material, such as metal. The body 100 has a generally thin, coin-like shape with a first side surface 104 defining a plurality of recesses 106, 107, a second side surface 108 opposite the first side surface 104, an inner peripheral surface 110 extending from the first side surface 104 to the second side surface 108 and that defines a central opening 112, and an outer peripheral surface 114 that extends from the first side surface 104 to the second side surface 108 that defines the outer perimeter shape of the body 100. The body 100 of the adapter 14 is configured for arrangement between the tool holder 16 and the mounting portion 38 of the accessory tool 24 with the first side surface 104 facing toward the tool holder and the second side surface 108 facing toward the mounting portion 38**.

The second side surface 108 of the body 100 includes an accessory adapter drive structure 118 for mating or interlocking with the accessory drive structure 60 of accessory tool 24. The accessory adapter drive structure 118 is configured substantially the same as the tool drive structure **50*b* shown in FIG. 2B. In particular, the second side surface 108 is provided with a plurality of protrusions 54' arranged about the central opening 112 shaped and positioned complementarily with respect to the openings 62 defined in the mounting portion 38 of the accessory drive structure 60 so that the protrusions 54' are received in the openings 62 when the mounting portion 38 is pressed against the second side surface 108 of the adapter 14. In alternative embodiments, the accessory adapter drive structure 118 incorporated into the second side surface 108 may be configured to interlock with the accessory drive structure of substantially any accessory tool for use with any of the tool drive structures 50*a*-50*f*** of FIGS. 2A-2F.

Figure 6A:
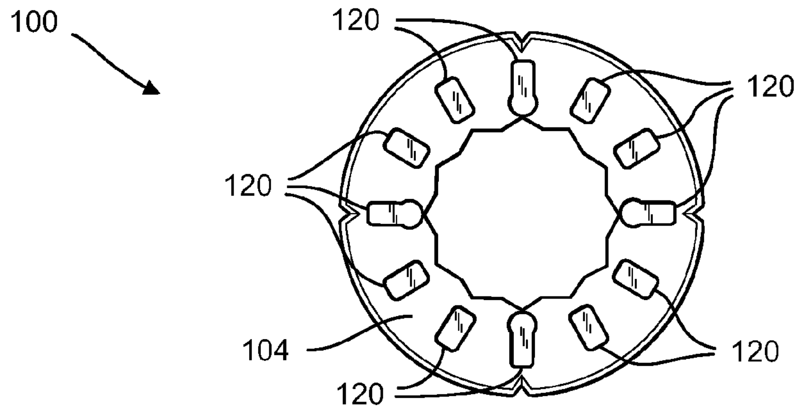
FIG. 6A is an elevational view of a first side surface of the adapter of FIG. 1 identifying the first tool adapter drive structure of the adapter.
Figure 6B:
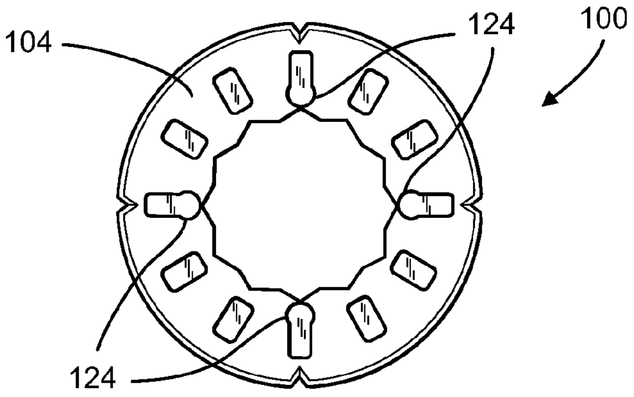
FIG. 6B is an elevational view of a first side surface of the adapter of FIG. 1 identifying the second tool adapter drive structure of the adapter.
Figure 6C:
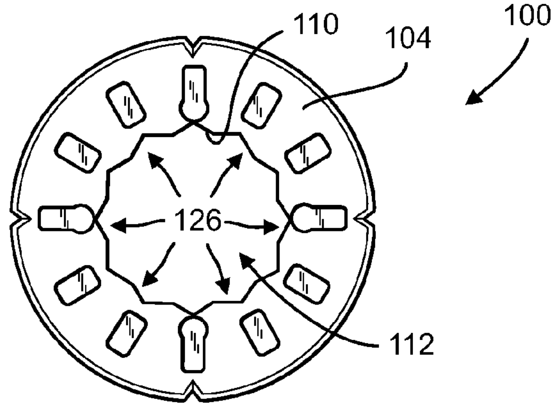
FIG. 6C is an elevational view of a first side surface of the adapter of FIG. 1 identifying the third tool adapter drive structure of the adapter.
Figure 7:
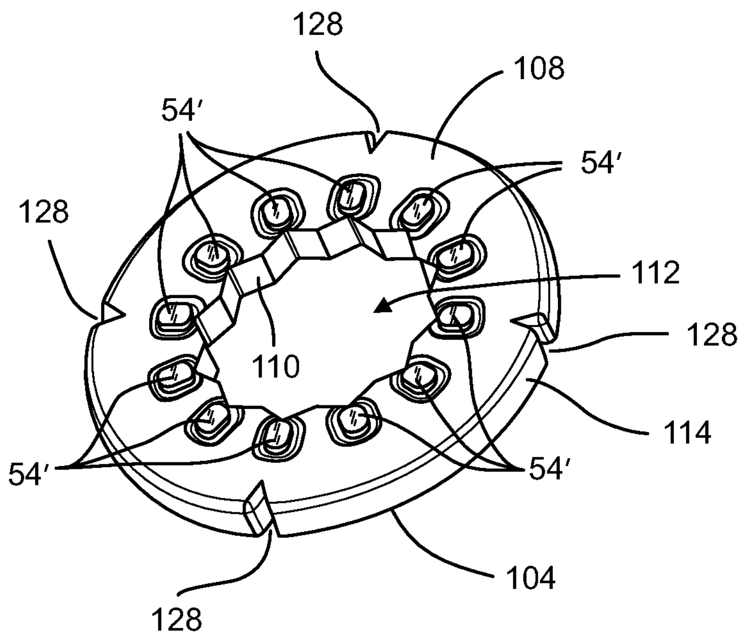
FIG. 7 is a perspective view of the second side surface of the adapter of FIG. 1.
Figure 8:
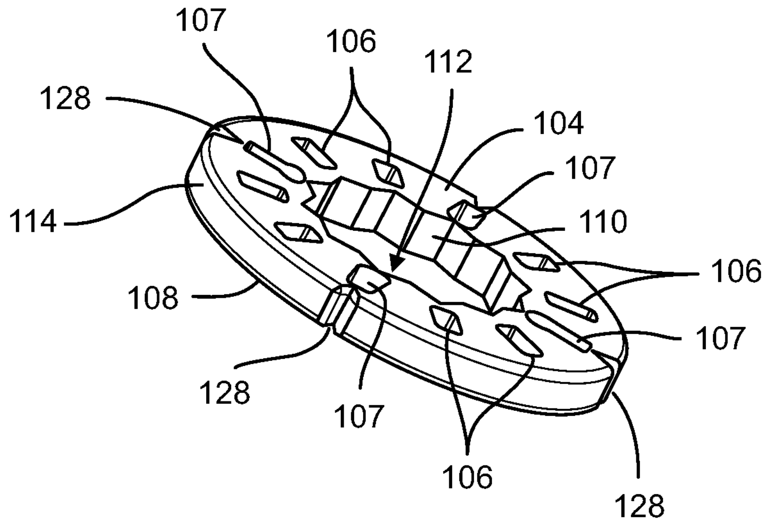
FIG. 8 is a perspective view of the first side surface of the adapter of FIG. 1.

The body 100 of the adapter 14 also includes a plurality of tool adapter drive structures that enable the body 100 to interlock with each of the plurality of distinct tool drive structures **50*a*-50*f* of FIGS. 2A-2F. As shown in FIGS. 6A-6C, the body 100 includes a first tool adapter drive structure 120 (FIG. 6A), a second tool adapter drive structure 124 (FIG. 6B), and a third tool adapter drive structure 126 (FIG. 6C). The first and the second tool drive structures 120, 124 define the configuration of the plurality of recesses 106, 107 in the first side surface 104 in a manner that enables the first tool adapter drive structure to mate with the tool drive structures 50*a* and 50*b* of FIGS. 2A and 2B, respectively, and enables the second tool adapter drive structure 124 to mate with the tool drive structure 50*f* of FIG. 2F. The third tool adapter drive structure 126 defines the configuration of the central opening 112 in a manner that enables the third tool adapter drive structure to mate with the tool drive structures 50*c*, 50*d*, and 50*e* of FIGS. 2C, 2D, and 2**E, respectively.

A total of twelve (12) recesses 106, 107 are defined in the first side surface 104 that are radially positioned about the central opening 112 and spaced apart from both the outer peripheral surface 114 and the inner peripheral surface 110. The first and the second tool adapter drive structures 120, 124 cooperate to define the four (4) recesses 107 that are spaced approximately 90° apart from each other about the circumference of the central opening 112, and the first tool adapter drive structure 120 alone defines the remaining eight (8) recesses 106. The eight recesses 106 each have substantially the same size, shape, and positioning with respect to inner peripheral surface 110. In the embodiment of FIGS. 4-8, the perimeters of the eight recesses 106 have a generally rectangular shape although in alternative embodiments any suitable shape may be used. The first tool adapter drive structure 120 defines the portions of the four recesses 107 that are closer to the outer peripheral surface 114 and therefore have a similar configuration as the recesses 106. The inner portions 109 of the four recesses 107 are defined by the second tool adapter drive structure 124, and are sized and shaped complementary to the protrusions 59 of the tool drive structure **50*f* of FIG. 2F. Consequently, the four recesses 107 have a distinct configuration in relation to the eight recesses 106**.

Figure 9A:
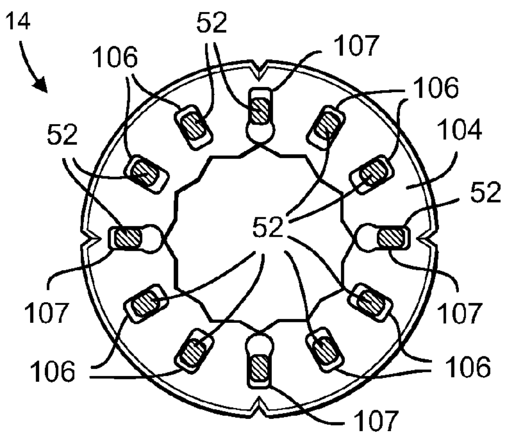
FIG. 9A is an elevational view showing the arrangement of the first side surface of the adapter of FIG. 1 in relation to the tool drive structure of FIG. 2A.

The eight recesses 106 and the outer portions of the four recesses 107 defined by the first tool adapter drive structure are sized, shaped, and positioned complementarily with respect to the protrusions 52 of the tool drive structure **50*a*. FIG. 9A depicts the arrangement of the twelve recesses 106, 107 defined in the first side surface 104 with respect to the protrusions 52 of the tool drive structure 50*a* (shaded portions in FIG. 9A). As can be seen, the eight recesses 106 and the outer portions of the four recesses 107 are aligned with the protrusions 52 of the tool drive structure 50*a* so that the protrusions 52 of the tool drive structure 50*a* mate with the eight recesses 106 and the outer portions of the four recesses 107 when the first side surface 104 of the adapter 14 and the proximal member 26 of the clamping assembly 16** are moved into engagement with each other.

Figure 2A:
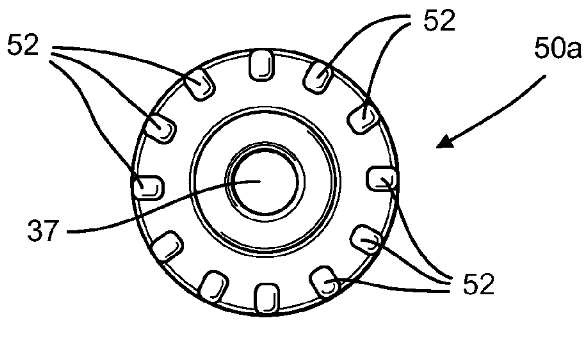
FIGS. 2A-2F depict elevational views of six (6) distinct tool drive structures, respectively, that may be utilized in the power tool of FIG. 1.
Figure 2B:
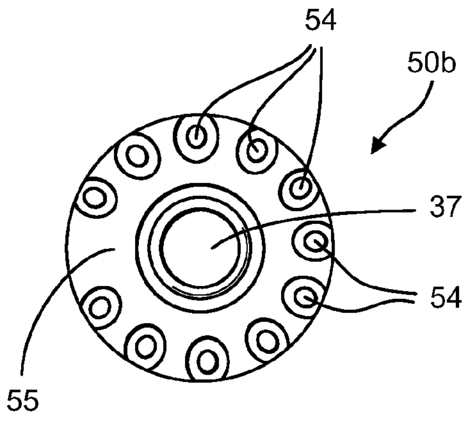
Figure 2C:
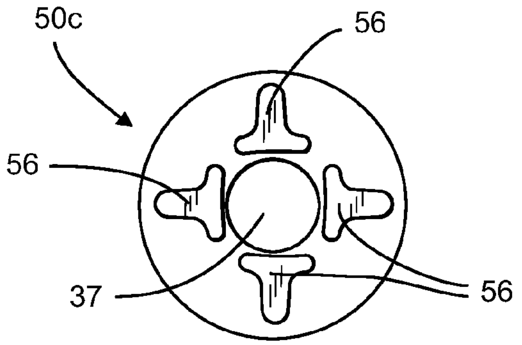
Figure 2D:
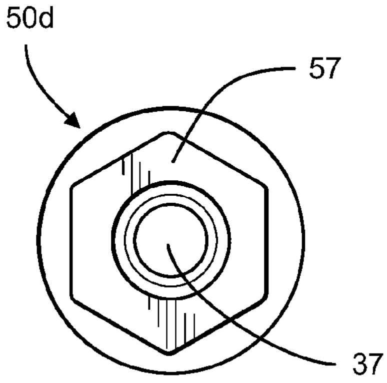
Figure 2E:
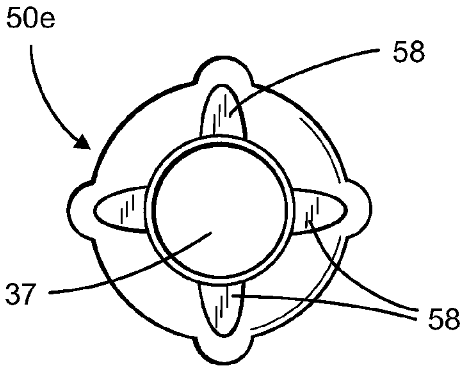
Figure 2F:
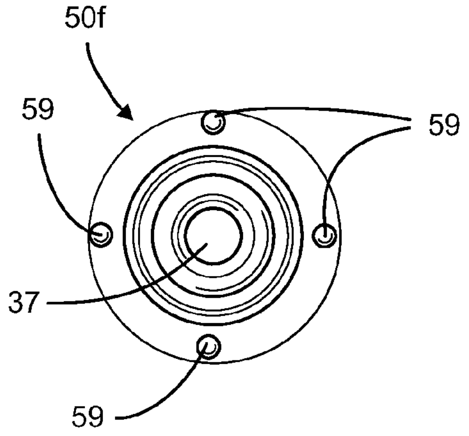
Figure 9B:
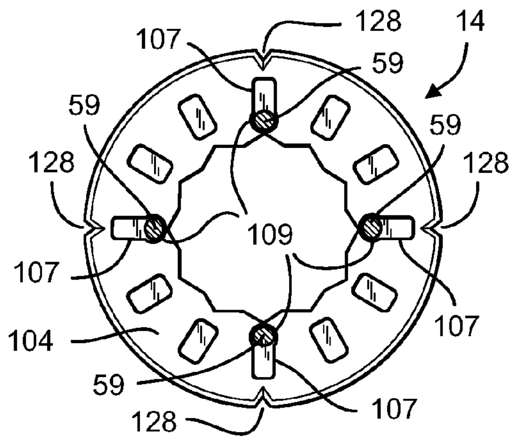
FIG. 9B is an elevational view showing the arrangement of the first side surface of the adapter of FIG. 1 in relation to the tool drive structure of FIG. 2F.

The inner portions 109 of the four recesses 107 defined by the second tool adapter drive structure 124 are sized, shaped, and positioned complementarily with respect to the protrusions 59 of the tool drive structure **50*f* of FIG. 2F. FIG. 9B depicts the arrangement of the inner portions 109 of the four recesses 107 with respect to the protrusions 59 of the tool drive structure 50*f* (shaded portions in FIG. 9B). As can be seen, the inner portions 109 of the four recesses 107 are aligned with the protrusions 59 of the tool drive structure 50*f* so that the protrusions 59 mate with the inner portions 107 of the four recesses when the first side surface 104 of the adapter 14 and the proximal member 26 of the clamping assembly 16** are moved into engagement with each other.

Depending on the sizes and shapes of the protrusions of the tool drive structures, the inner portions 109 of the four recesses 107 defined by the second tool adapter drive structure 124 may have a different size and shape than the outer portions of the four recesses 107 defined by the first tool adapter drive structure 120. In the embodiments of FIGS. 4-8, the inner portions 109 defined by the second tool adapter drive structure 124 have a generally rounded perimeter shape causing the recesses 107 to extend farther toward the inner peripheral surface 110 than the eight recesses 106 and have a width (parallel to the diameter of the central opening 112 that is wider than the corresponding dimensions of the outer portions of the recesses 107 to facilitate engagement with the protrusions 59 of the tool drive structure **50*f***.

Figure 4:
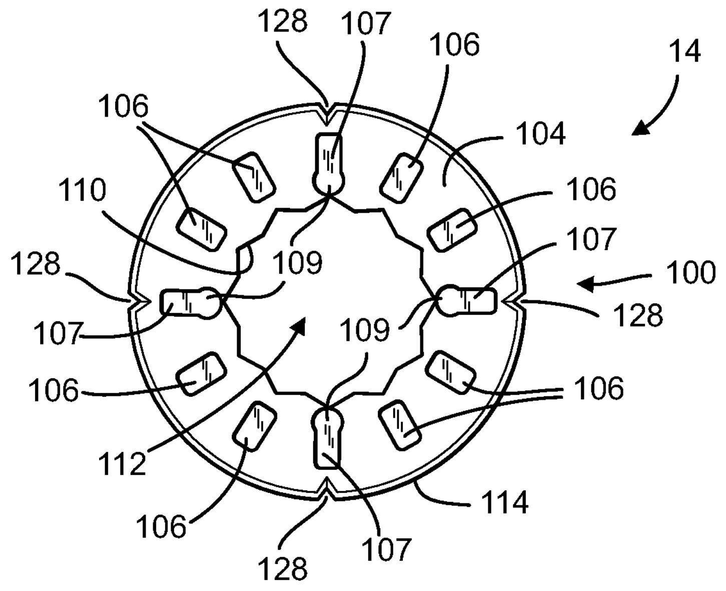
FIG. 4 is an elevational view of a first side surface of the adapter shown in FIG. 1.
Figure 5:
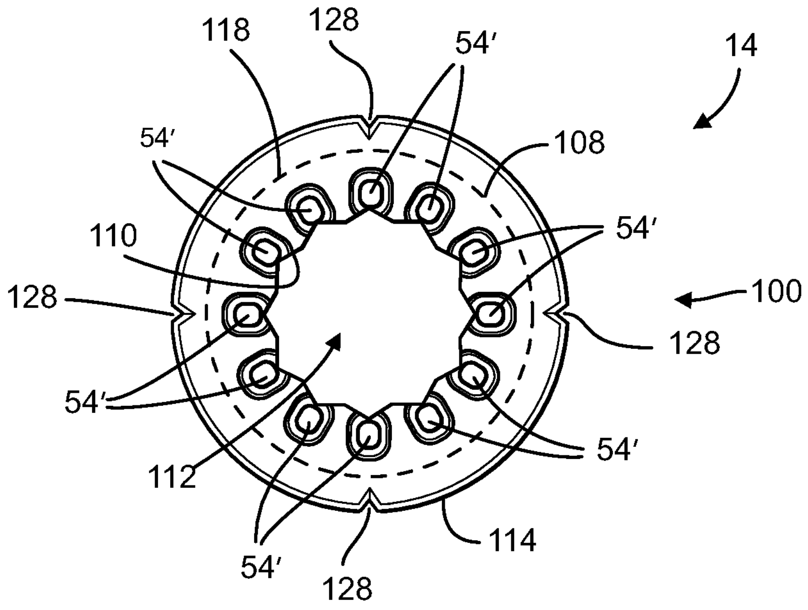
FIG. 5 is an elevational view of the second side surface of the adapter of FIG. 1.

Alignment features 128 are defined in the outer peripheral surface 114 to facilitate the alignment of the inner portions 109 of the four recesses 107 defined by the second tool adapter drive structure 124 with the four protrusions 59 of the tool drive structure **50*f*. As depicted, four (4) alignment features 128 are defined in the outer peripheral surface 114 that are spaced apart from each other by 90° along the outer peripheral surface 114 in order to align with the inner portions 109 of the four recesses 107 defined by the second tool adapter drive structure 124. In one embodiment, the alignment features 128 comprise notches, or indentations, defined in the outer peripheral surface 114 as best seen in FIGS. 4 and 5**.

Figure 10A:
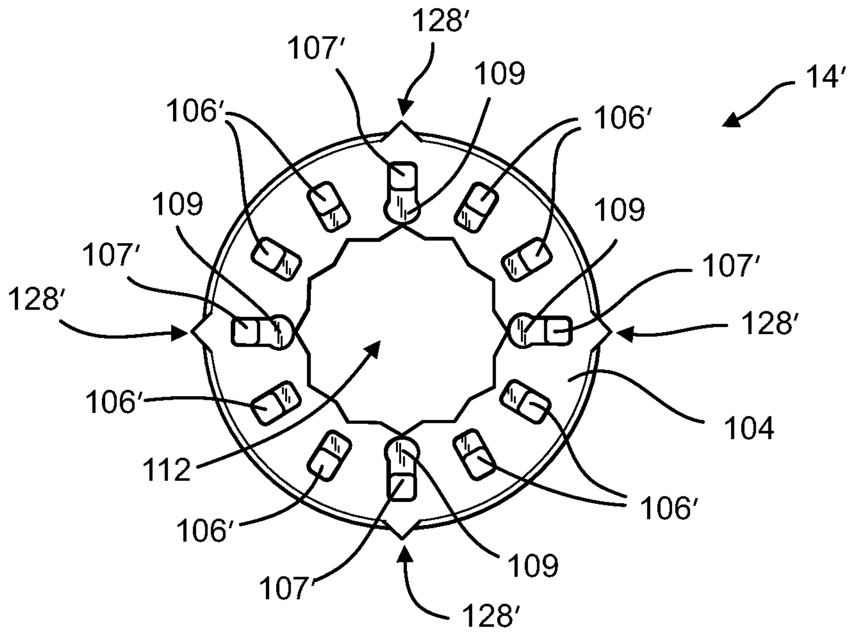
FIG. 10A is an elevational view of a first side surface of an alternative embodiment of the adapter of FIG. 1 that may be substituted for use with the power tool and accessory tool of FIG. 1.
Figure 10B:
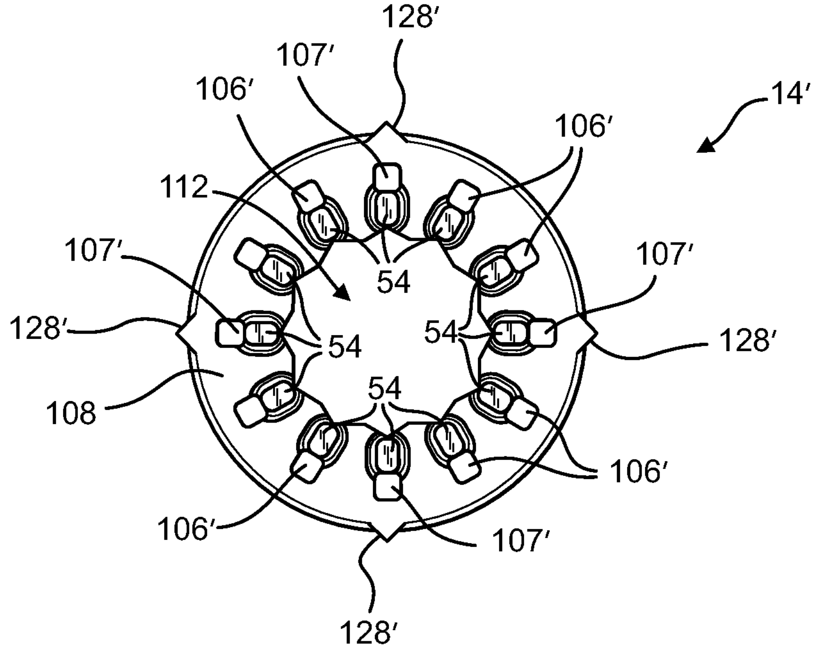
FIG. 10B is an elevational view of a second side surface of the alternative embodiment of the adapter of FIG. 10A.

FIGS. 10A and 10B depict an alternative embodiment of an adapter 14' in which the alignment features 128' comprise protrusions, or projections, located on the outer peripheral surface 114' instead of notches or indentations. Adding material to the outer peripheral surface 114' of the adapter 14' to form the protruding alignment features 128' increases the mass of the adapter 14' in relation to the mass of the embodiment of the adapter 14 having notched alignment features 128. In order to maintain a substantially consistent mass between adapters having protruding alignment features (FIGS. 10A and 10B) and adapters having indented alignment features (FIGS. 4 and 5), the amount of material used to form other portions of the body of the adapter 14' is reduced in relation to the adapter 14 to compensate for the mass added by the protruding alignment features 128'. For example, in the embodiment of FIGS. 10A and 10B, to compensate for the mass added by the protruding alignment features 128', openings 106' and 107' are defined by the first tool adapter drive structure 120 (FIGS. 4 and 6A) as an substitute for recesses 106 and 107 as defined in adapter 14.

Figure 9C:
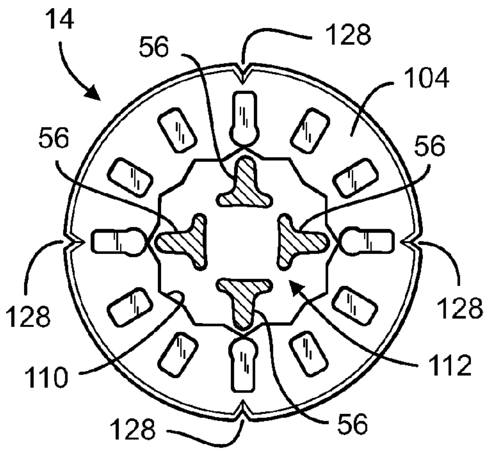
FIG. 9C is an elevational view showing the arrangement of the first side surface of the adapter of FIG. 1 in relation to the tool drive structure of FIG. 2C.
Figure 9D:
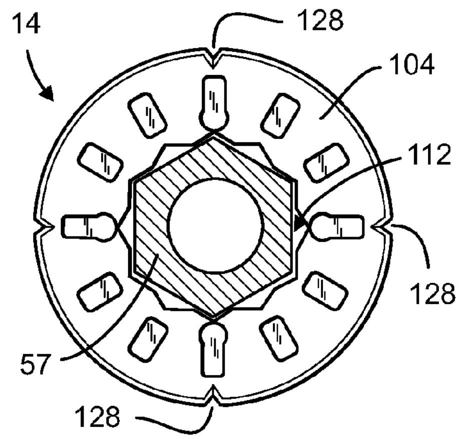
FIG. 9D is an elevational view showing the arrangement of the first side surface of the adapter in relation to the tool drive structure of FIG. 2D.
Figure 9E:
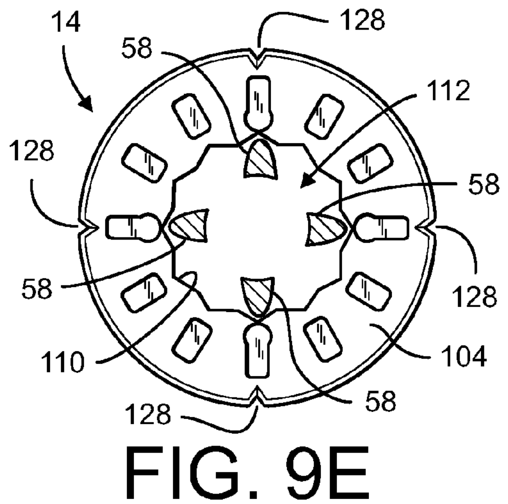
FIG. 9E is an elevational view showing the arrangement of the first side surface of the adapter of FIG. 1 in relation to the tool drive structure of FIG. 2E.

As mentioned, the third tool adapter drive structure 126 defines the configuration of the central opening 112. In the embodiment of FIGS. 4-8, the central opening 112 is configured as a double hex opening. FIGS. 9C-9E depict the double hex opening 112 in relation to the tool drive structures 50*c*, 50*d*, and 50*e* (shaded portions in FIGS. 9C-9D), respectively. As can be seen, the double hex opening 112 is sized and shaped substantially complementarily with respect to each of the protrusions 56, 57, and 58 of tool drive structures 50*c*, 50*d*, and 50*e*, respectively, which allows the tool drive structures 50*c*, 50*d*, and 50*e* to mate with the double hex opening 112 when the first side surface 104 of the adapter 14 and the proximal member 26 of the clamping assembly 16 are moved into engagement with each other.

Accordingly, the adapter 14, as described above, enables the accessory tool 24 to be coupled to and driven by the tool drive structure 50*d* of the power tool 10 of FIG. 1. In use, the first side surface 104 of the adapter 14 is placed on the tool holder 16 and aligned with the tool holder so that the tool drive structure 50*d* of the tool holder 16 is mated with the appropriate tool adapter drive structure 120, 124, 126 of the adapter. The adapter 14 is aligned with the tool holder 16 so that the tool drive structure 50*d* is received in and mated with the double hex shaped central opening 112 defined by the third tool adapter drive structure of the adapter. The mounting portion 38 of the accessory tool 24 is moved into engagement with the second side surface 108 of the adapter 14 and aligned with the adapter 14 so that the accessory drive structure 60 defined by the mounting portion 38 mates with the accessory adapter drive structure 118 defined by the second side surface 108 of the adapter 14. The fastening device 30, e.g., clamping screw, is then used to clamp the accessory tool 24 to the tool holder 16 thereby locking the tool drive structure of the tool holder and the accessory drive structure of the accessory tool into engagement with the corresponding adapter drive structures of the adapter to thereby secure the accessory tool to the tool holder.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An adapter for coupling an accessory tool to any of a plurality of power tools, each of said plurality of power tools having a distinct tool drive structure in comparison to tool drive structures of the rest of said plurality of power tools, said adapter comprising a body that includes:

a first side surface, a second side surface positioned opposite to said first side surface, an inner peripheral surface extending from said first side surface to said second side surface, said inner peripheral surface defining a central opening, an outer peripheral surface extending from said first side surface to said second side surface, wherein said first side surface has defined therein a plurality of recesses positioned around said central opening, wherein said body has a first adapter drive structure, a second adapter drive structure, and a third adapter drive structure, wherein said first adapter drive structure defines a first plurality of recesses of said plurality of recesses positioned around said central opening and said second adapter drive structure defines a second plurality of recesses of said plurality of recesses positioned around said central opening, each of said second plurality of recesses being non-contiguous with each of said first plurality of recesses, wherein said third adapter drive structure defines said central opening, wherein said first adapter drive structure, said second adapter drive structure, and said third adapter drive structure each possesses a distinct configuration in comparison to each other, wherein said first adapter drive structure is configured to mate with a first tool drive structure of a first power tool of said plurality of power tools, wherein said second adapter drive structure is configured to mate with a second tool drive structure of a second power tool of said plurality of power tools, wherein said third adapter drive structure is configured to mate with a third tool drive structure of a third power tool of said plurality of accessory tools, and wherein at least a single one of said second plurality of recesses of said second adapter drive structure is disposed immediately adjacent to and between two of said first plurality of recesses of said first adapter drive structure.

2. The adapter of claim 1, wherein said plurality of recesses is also spaced apart from said inner peripheral surface and said outer peripheral surface.

3. The adapter of claim 1, wherein:

said body further has a fourth adapter drive structure located on said second side surface, and said fourth adapter drive structure is configured to mate with an accessory drive structure of said accessory tool.

4. The adapter of claim 3, wherein:

said plurality of recesses includes twelve recesses positioned around said central opening, and said fourth adapter drive structure includes twelve protrusions positioned around said central opening.

5. The adapter of claim 1, wherein said central opening is configured as a double hex opening.

6. An adapter for coupling an accessory tool to any of a plurality of power tools, each of said plurality of power tools having a distinct tool drive structure in comparison to tool drive structures of the rest of said plurality of power tools, said adapter comprising a body that includes:

a first side surface, a second side surface positioned opposite to said first side surface, an inner peripheral surface extending from said first side surface to said second side surface, said inner peripheral surface defining a central opening, an outer peripheral surface extending from said first side surface to said second side surface, wherein said first side surface has defined therein a plurality of recesses positioned around said central opening, wherein said body has a first adapter drive structure and a second adapter drive structure, wherein said first adapter drive structure defines a first plurality of recesses of said plurality of recesses positioned around said central opening and said second adapter drive structure defines a second plurality of recesses of said plurality of recesses positioned around said central opening, each of said second plurality of recesses being non-contiguous with each of said first plurality of recesses, wherein said first adapter drive structure and said second adapter drive structure each possesses a distinct configuration in comparison to each other, wherein said first adapter drive structure is configured to mate with a first tool drive structure of a first power tool of said plurality of power tools, and wherein said second adapter drive structure is configured to mate with a second tool drive structure of a second power tool of said plurality of power tools, and wherein at least a single one of said second plurality of recesses of said second adapter drive structure is disposed immediately adjacent to and between two of said first plurality of recesses of said first adapter drive structure.

7. The adapter of claim 1, wherein each recess of said first and second plurality of recesses is disposed along a common radius.

8. The adapter of claim 7, wherein one of the first adapter drive structure and second adapter drive structure is configured to not mate with one of the first tool drive structure and the second tool drive structure.

9. An adapter for coupling an accessory tool to any of a plurality of power tools, each of said plurality of power tools having a distinct tool drive structure in comparison to tool drive structures of the rest of said plurality of power tools, said adapter comprising a body that includes:

a first side surface, a second side surface positioned opposite to said first side surface, an inner peripheral surface extending from said first side surface to said second side surface, said inner peripheral surface defining a central opening, an outer peripheral surface extending from said first side surface to said second side surface, wherein said first side surface has defined therein a plurality of recesses positioned around said central opening, wherein said body has a first adapter drive structure, a second adapter drive structure, and a third adapter drive structure, wherein said first adapter drive structure and said second adapter drive structure define said plurality of recesses, wherein said third adapter drive structure defines said central opening, wherein said first adapter drive structure, said second adapter drive structure, and said third adapter drive structure each possesses a distinct configuration in comparison to each other, wherein said first adapter drive structure is configured to mate with a first tool drive structure of a first power tool of said plurality of power tools, wherein said second adapter drive structure is configured to mate with a second tool drive structure of a second power tool of said plurality of power tools, and wherein said third adapter drive structure is configured to mate with a third tool drive structure of a third power tool of said plurality of accessory tools, said outer peripheral surface defines a number of alignment features, and said number of alignment features are aligned with recesses of said plurality of recesses that are defined in part by said second adapter drive structure.

10. The adapter of claim 9, wherein said number of alignment features includes a plurality of notches defined in said outer peripheral surface.

11. The adapter of claim 10, wherein:

said plurality of notches includes four notches defined in said outer peripheral surface, and said four notches are spaced apart from each other by 90° along said outer peripheral surface.

12. The adapter of claim 9, wherein said number of alignment features includes a plurality of protrusions defined by said outer peripheral surface.

13. The adapter of claim 9, wherein:

said plurality of protrusions includes four protrusions defined by said outer peripheral surface, and said four protrusions are spaced apart from each other by 90° along said outer peripheral surface.

14. The adapter of claim 6, wherein said central opening is configured as a double hex opening.

15. The adapter of claim 6, wherein:

said outer peripheral surface defines a number of alignment features, and said number of alignment features are aligned with recesses of said second plurality of recesses.

16. The adapter of claim 15, wherein said number of alignment features includes a plurality of notches defined in said outer peripheral surface.

17. The adapter of claim 16, wherein:

said plurality of notches includes four notches defined in said outer peripheral surface, and said four notches are spaced apart from each other by 90° along said outer peripheral surface.

18. The adapter of claim 15, wherein said number of alignment features includes a plurality of protrusions defined by said outer peripheral surface.

19. The adapter of claim 15, wherein:

said plurality of protrusions includes four protrusions defined by said outer peripheral surface, and said four protrusions are spaced apart from each other by 90° along said outer peripheral surface.

20. The adapter of claim 6, wherein said first and second plurality of recesses are also spaced apart from said inner peripheral surface and said outer peripheral surface.

21. The adapter of claim 6, wherein:

said body further has a third adapter drive structure located on said second side surface, and said third adapter drive structure is configured to mate with an accessory drive structure of said accessory tool.

22. The adapter of claim 21, wherein:

said first and second plurality of recesses includes twelve recesses positioned around said central opening, and said third adapter drive structure includes twelve protrusions positioned around said central opening.

* * * * *